United States Patent
Bressler et al.

(10) Patent No.: US 11,554,982 B2
(45) Date of Patent: Jan. 17, 2023

(54) PROCESS FOR FORMING CURVED GLASS LAMINATE ARTICLE FORMED USING SEPARATION MATERIAL

(71) Applicant: CORNING INCORPORATED, Corning, NY (US)

(72) Inventors: Douglas Dale Bressler, Julian, PA (US); Theresa Chang, Painted Post, NY (US); Allan Mark Fredholm, Vulaines sur Seine (FR); Michele Marie-Louise Fredholm, Vulaines sur Seine (FR); Louis Mattos, Jr., Painted Post, NY (US); Jason Scott Stewart, Hornell, NY (US)

(73) Assignee: Corning Incorporated, Corning, NY (US)

( * ) Notice: Subject to any disclaimer, the term of this patent is extended or adjusted under 35 U.S.C. 154(b) by 280 days.

(21) Appl. No.: 16/613,886

(22) PCT Filed: May 15, 2018

(86) PCT No.: PCT/US2018/032618
§ 371 (c)(1),
(2) Date: Nov. 15, 2019

(87) PCT Pub. No.: WO2018/213210
PCT Pub. Date: Nov. 22, 2018

(65) Prior Publication Data
US 2020/0140317 A1    May 7, 2020

Related U.S. Application Data (60) Provisional application No. 62/507,355, filed on May 17, 2017.

(51) Int. Cl.
*C03B 40/033* (2006.01)
*B32B 7/06* (2019.01)
(Continued)

(52) U.S. Cl.
CPC .............. *C03B 40/033* (2013.01); *B32B 7/06* (2013.01); *B32B 17/06* (2013.01);
(Continued)

(58) Field of Classification Search
CPC .... A44C 21/00; B42D 25/324; B42D 25/373; B42D 25/425; B44C 1/24; B32B 17/06;
(Continued)

(56) References Cited

U.S. PATENT DOCUMENTS 3,282,772 A * 11/1966 Davis, Sr. ......... B32B 17/10339
428/215
3,300,351 A     1/1967 Richardson
(Continued)

FOREIGN PATENT DOCUMENTS

CN    106007405 A    10/2016
CN    106255592 A    12/2016
(Continued)

OTHER PUBLICATIONS

International Search Report and Written Opinion of the International Searching Authority in Corresponding PCT Application No. PCT/US2018/032618; dated Sep. 6, 2018 13 Pages; European Patent Office.
(Continued)

*Primary Examiner* — Sonya M Sengupta (57) ABSTRACT

A system and process for forming a curved glass laminate article is provided. The process and system utilizes a separation material, such as solid lubricating material and/or a spray applied separation material that Applicant has determined reduces bending dot formation during co-sagging shaping of glass sheets. The bending dot reduction provided by the separation materials discussed herein is particularly seen when the pair of glass sheets have significantly different thicknesses and/or viscosities from each other.

4 Claims, 3 Drawing Sheets

(51) Int. Cl.
  *B32B 17/06* (2006.01)
  *C03B 23/025* (2006.01)
(52) U.S. Cl.
  CPC ...... *C03B 23/0252* (2013.01); *B32B 2315/08* (2013.01); *B32B 2605/08* (2013.01)
(58) Field of Classification Search
  CPC ... B32B 2315/08; B32B 2605/08; B32B 7/06; C03B 23/0252; C03B 40/033
  See application file for complete search history.

(56) References Cited

U.S. PATENT DOCUMENTS

| | | | |
|---|---|---|---|
| 4,828,598 A | | 5/1989 | Imamura et al. |
| 5,110,336 A | | 5/1992 | Kadunce et al. |
| 5,383,990 A | * | 1/1995 | Tsuji .................. C03B 23/0305 65/106 |
| 6,518,211 B1 | | 2/2003 | Bradshaw et al. |
| 6,983,104 B2 | | 1/2006 | Longobardo et al. |
| 7,143,609 B2 | * | 12/2006 | Aitken .................... C03C 17/22 65/319 |
| 7,217,334 B2 | * | 5/2007 | Toyoda .................. B32B 38/10 156/247 |
| 9,375,900 B2 | | 6/2016 | Tsuchiya et al. |
| 2012/0210749 A1 | * | 8/2012 | Feng ...................... B82Y 30/00 977/773 |
| 2014/0093702 A1 | | 4/2014 | Kitajima |
| 2014/0150929 A1 | * | 6/2014 | Sandstrom ......... B23K 35/3611 148/24 |
| 2016/0250825 A1 | * | 9/2016 | Cleary .............. B32B 17/10137 428/215 |
| 2016/0297176 A1 | * | 10/2016 | Rickerl ................... B32B 37/06 |
| 2018/0207911 A1 | | 7/2018 | Lampman et al. |
| 2018/0237326 A1 | * | 8/2018 | Fredholm ......... B32B 17/10788 |
| 2019/0134953 A1 | | 5/2019 | Oh et al. |
| 2020/0140317 A1 | * | 5/2020 | Bressler .................... B32B 7/06 |

FOREIGN PATENT DOCUMENTS

| | | |
|---|---|---|
| EP | 0414232 A1 | 2/1991 |
| EP | 1546048 A1 | 6/2005 |
| EP | 3450161 B1 | 4/2020 |
| GB | 2335423 A | 9/1999 |
| JP | 2016188166 A | 11/2016 |
| JP | 2020-506860 A | 3/2020 |
| WO | 2004/026778 A1 | 4/2004 |
| WO | 2015/054112 A1 | 4/2015 |

OTHER PUBLICATIONS

Chinese Patent Application No. 201880045592.5, Office Action dated Oct. 20, 2021, 8 pages English Translation Only, Chinese Patent Office.

* cited by examiner

PROCESS FOR FORMING CURVED GLASS LAMINATE ARTICLE FORMED USING SEPARATION MATERIAL

This application is a national stage application under 35 U.S.C. § 371 of International Application No. PCT/US2018/032618, filed on May 15, 2018, which claims the benefit of priority under 35 U.S.C. § 119 of U.S. Provisional Application Ser. No. 62/507,355 filed on May 17, 2017, the content of which is relied upon and incorporated herein by reference in its entirety.

BACKGROUND

The disclosure relates generally to forming a curved glass laminate article, and specifically to processes for co-forming (e.g., co-sagging) glass sheets utilizing a bend-dot reducing separation material. Curved glass laminate sheets or articles find use in many applications, particularly as for vehicle or automotive window glass. Typically, curved glass sheets for such applications have been formed from relatively thick sheets of glass material. To improve shape consistency between individual glass layers of the laminate article, the glass materials may be shaped to the desired shape/curvature via a co-forming process, such as a co-sagging process. Applicant has found that traditional co-sagging processes may produce undesirable characteristics (e.g., excessive bend-dots) in the curved glass sheets, the severity of which appears to increase as the difference between the thicknesses and/or viscosities of the co-sagged pair of glass sheets increases.

SUMMARY

One embodiment of the disclosure relates to a process for forming a curved glass laminate article. The process includes applying a separation material onto at least one of a surface of a first sheet of glass material and a surface of a second sheet of glass material. The process includes placing an outer region of the first sheet of glass material into contact with a support surface of a shaping frame. The shaping frame defines an open central cavity surrounded at least in part by the support surface. The process includes placing the second sheet of glass material onto the first sheet of glass material such that the separation material is located between an upper surface of the first sheet of glass material and a lower surface of the second sheet of glass material, and the first sheet of glass material and the second sheet of glass material are both supported by the shaping frame. The process includes heating the first sheet of glass material, the separation material and the second sheet of glass material together while supported by the shaping frame such that central regions of the first and second sheets of glass material deform downward into the open central cavity of the shaping frame. The first sheet of glass material has an average thickness, T1, and the second sheet of glass material has an average thickness, T2. T1 is at least 2.5 times T2.

An additional embodiment of the disclosure relates to a process for forming a curved glass laminate article. The process including spraying a separation material onto at least one of a surface of a first sheet of glass material and a surface of a second sheet of glass material. The process placing an outer region of the first sheet of glass material into contact with a support surface of a shaping frame, and the shaping frame defines an open central cavity surrounded at least in part by the support surface. The process includes placing the second sheet of glass material onto the first sheet of glass material such that the separation material is located between an upper surface of the first sheet of glass material and a lower surface of the second sheet of glass material, and the first sheet of glass material and the second sheet of glass material are both supported by the shaping frame. The process includes heating the first sheet of glass material, the separation material and the second sheet of glass material together while supported by the shaping frame such that central regions of the first and second sheets of glass material deform downward into the open central cavity of the shaping frame. The first sheet of glass material is formed from a first glass composition and the second sheet of glass material is formed from a second glass composition different from the first glass composition.

An additional embodiment of the disclosure relates to a process for forming a curved glass laminate article. The process includes depositing a separation material onto at least one of a surface of a first sheet of glass material and a surface of a second sheet of glass material. The process includes placing an outer region of the first sheet of glass material into contact with a support surface of a shaping frame, the shaping frame defining an open central cavity surrounded at least in part by the support surface. The process includes placing the second sheet of glass material onto the first sheet of glass material such that the separation material is located between an upper surface of the first sheet of glass material and a lower surface of the second sheet of glass material, and the first sheet of glass material and the second sheet of glass material are both supported by the shaping frame. The process includes heating the first sheet of glass material, the separation material and the second sheet of glass material together while supported by the shaping frame such that central regions of the first and second sheets of glass material deform downward into the open central cavity of the shaping frame. The separation material comprises a solid lubricating material that decreases friction between the first and second sheets of glass material. The first sheet of glass material has an average thickness, T1, and the second sheet of glass material has an average thickness, T2. T1 is different from T2. The first sheet of glass material is formed from a first glass composition and the second sheet of glass material is formed from a second glass composition different from the first glass composition, and the first glass composition has a viscosity during heating that is different from a viscosity of the second glass composition during heating.

An additional embodiment of the disclosure relates to a curved glass laminate article made by any of the method(s) and/or system(s) disclosed herein.

Additional features and advantages will be set forth in the detailed description that follows, and, in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

DETAILED DESCRIPTION

Referring generally to the figures, various embodiments of a system and method for shaping, bending or sagging a stack of glass sheets for formation of a curved, glass laminate article are shown and described. In general, conventional processes for forming curved, laminated glass articles involve heating a pair of stacked glass plates or sheets on a forming ring to near the softening temperature of the glass until the glass has sagged to the desired shape and depth. A separation material is used as a separation layer between the two glass sheets preventing the glass sheets being bonded/fused together during heating. While such co-sagging processes have a variety of advantages (e.g., improving shape matching between the glass sheets that will form the laminate, efficient use of heating equipment, process throughput, etc.), co-sagging often produces optical defects known in the industry as bending dots.

Figure 6:
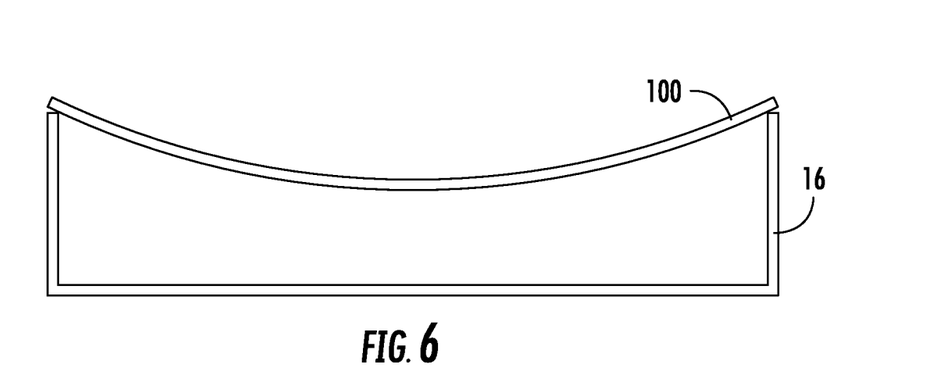
FIG. 6 illustrates the degree of sagging experienced by a thick glass sheet within a heating station.
Figure 7:
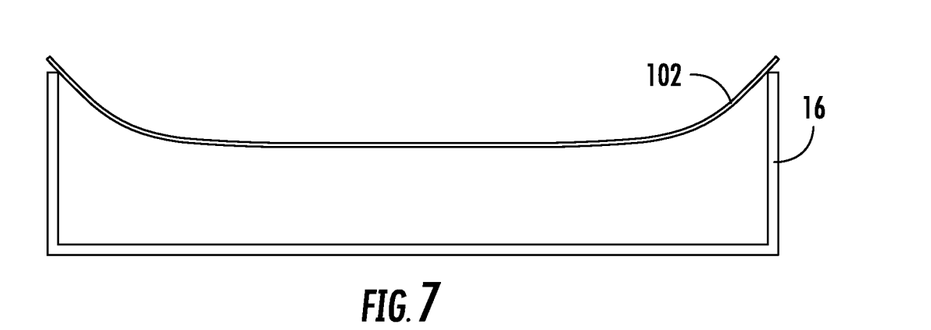
FIG. 7 illustrates the degree of sagging experienced by a thin glass sheet within a heating station.

Applicant has found that use of traditional separation materials can lead to formation of an undesirable level of bending dots, particular when co-sagging is used with two glass sheets having significantly different thicknesses and/or different material properties, such as viscosity. In general, bending dot formation is believed to increase as the contact pressure between the two glass sheets is increased during co-sagging. This increased contact pressure during co-sagging may be a function of viscosity and/or thickness differentials between the two glass sheets in the stacked arrangement. Increased contact pressure is believed to stem from the different shapes that different glass sheets may form during sagging. As shown in FIG. 6, when a sheet of glass is sagged under gravity by itself, a thicker glass sheet 100 will produce a more parabolic shape. While, as shown in FIG. 7, a thinner glass sheet 102 will produce a "bath tub" like shape where curvature is greatest near the edges and is reduced near the center. As a result, when the two sheets are co-sagged, contact pressure is increased near the edges when a thin ply is sagged on top of a thick ply, and contact pressure is increased near the center when a thick ply is sagged on top of a thin ply. This increase in contact pressure is thought to contribute to the creation of bending dot defects through increasing imprintation of the separation material particles into the glass surfaces. Thus, as will be understood, the difference in sag shape illustrated in FIGS. 6 and 7 generally will increase as the thickness difference and the viscosity difference between the two glass sheets increases, and thus, the sensitivity to bending dot formation also appears to increases as the thickness difference and the viscosity difference between the two glass sheets increases.

Applicant has identified various separation materials, separation layer structures and/or separation material application processes that decrease or eliminate bending dot formation, even with large differences in glass sheet thickness and glass sheet viscosities. For example, Applicant has identified that lubricating materials that decrease friction between the two glass sheets decreases/eliminates bending dot formations. As a specific example, Applicant has identified that separation powders having lamellar structure and/or having a high lubricity decreases/eliminates bending dot formation. In particular, Applicant has found that a separation material comprising hexagonal boron nitride particles and/or graphite particles decreases/eliminates bending dot formation. In addition, Applicant has determined that applying the separation material through a spraying process (e.g., spraying a liquid containing the separation material, flame pyrolysis, etc.) also appears to decrease/eliminate bending dot formation. Without wishing to be bound by theory, Applicant hypothesizes that spray application of the separation material may result in a uniform, low thickness layer of separation material that evenly distributes the contact pressure in a way that avoids bending dot formation.

As will be discussed in more detail below, Applicant has determined that the separation material innovations discussed herein provide for better bending dot reduction than prior approaches. For example, some prior sources have indicated that bending dot formation can be reduced simply by reducing the amount of separation powder used, and some prior sources have indicated that inverting the stack such that the thicker sheet is located on top of the smaller sheet during shaping is effective to reduce bending dot formation particularly for co-sagging glass sheet pairs with larger thickness and/or viscosity differences. Applicant has found that neither of these leading approaches are effective at satisfactorily reducing bending dot defects, particularly for pairs of glass sheets having larger thickness differences (e.g., greater than 2.5×) and large viscosity differences (which is the case when sheets of different glass materials are used for co-sagging).

Figure 1:
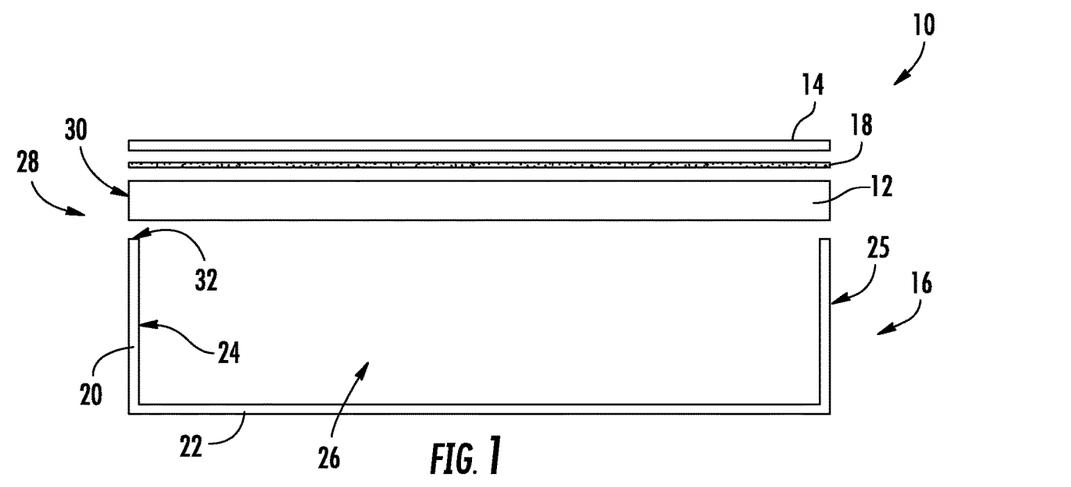
FIG. 1 is a schematic, cross-sectional view showing stacking of glass sheets for co-sagging, according to an exemplary embodiment.
Figure 2:
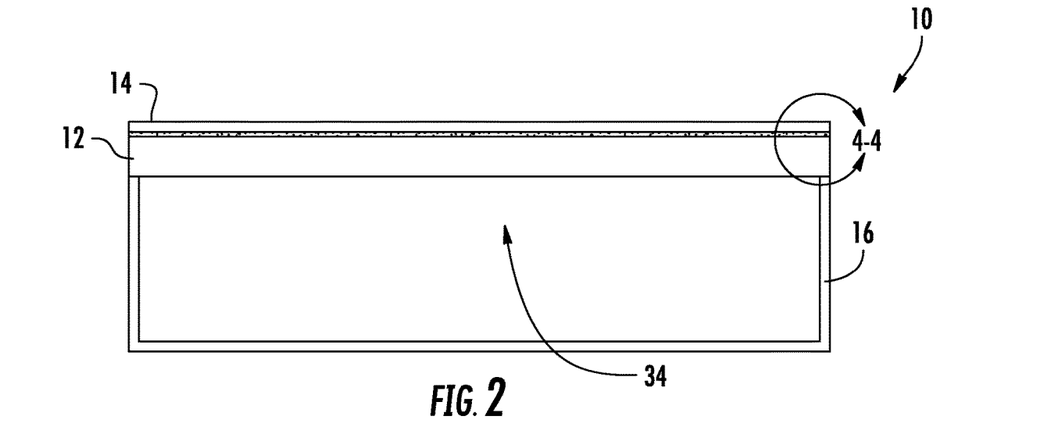
FIG. 2 is a schematic, cross-sectional view showing stacked glass sheets supported on a bending ring, according to an exemplary embodiment.

Referring to FIG. 1 and FIG. 2, a system and process for forming a curved glass article is shown according to an exemplary embodiment. In general, system 10 includes one or more sheet of glass material, shown as a pair of glass sheets 12 and 14, supported by a shaping frame, shown as bending ring 16. It should be understood that bending ring 16 may have a wide variety of shapes selected based on the shape of the glass sheets to be supported, and use of the term ring does not necessarily denote a circular shape.

In general, a separation material 18 is applied to at least one surface of glass sheet 12 and/or of glass sheet 14. In one specific embodiment, separation material 18 is applied to an upper surface of lower glass sheet 12. In other embodiments, separation material 18 is applied to a lower surface of glass sheet 14. In such embodiments, separation material 18 may be applied to a surface of glass sheet 12 and/or 14 when the glass sheets are positioned in any orientation, and the terms upper and lower refer to the orientation of surfaces when supported for bending on ring 16. In general, separation material 18 is a material that prevents sheets 12 and 14 from bonding together during the heating stages of the curve formation, and as will be discussed in more detail below, separation material 18 is formed from a material and/or is applied in a manner that Applicant has identified as being effective at reducing bending dot formation.

As shown in FIG. 1, bending ring 16 includes a support wall, shown as sidewall 20, and a bottom wall 22. Sidewall 20 extends upward and away from bottom wall 22. The radially inward facing surface 24 of sidewall 20 defines an open central region or cavity 26, and an upward facing surface of bottom wall 22 defines the lower end of cavity 26. A radially outward facing surface 25 is opposite of inward facing surface 24.

Separation material 18 is applied to the upper surface of glass sheet 12. Upper glass sheet 14 is placed onto separation material 18 such that a lower surface of upper glass sheet 14 is in contact with separation material 18. As can be seen in FIGS. 1 and 2, in this arrangement, separation material 18 acts as a barrier between glass layers 12 and 14 which prevents the glass sheets 12 and 14 from bonding together at the high temperatures during the sagging process.

To begin the shaping process, an outer region 28 of glass sheet 12 adjacent the outer perimeter edge 30 of the glass sheet is placed into contact with a support surface, shown as upward facing surface 32, of bending ring 16. In this arrangement, glass sheets 12 and 14 are both supported by the contact between upward facing surface 32 with glass sheet 12 such that central regions 34 of glass sheets 12 and 14 are supported over central cavity 26.

Figure 3:
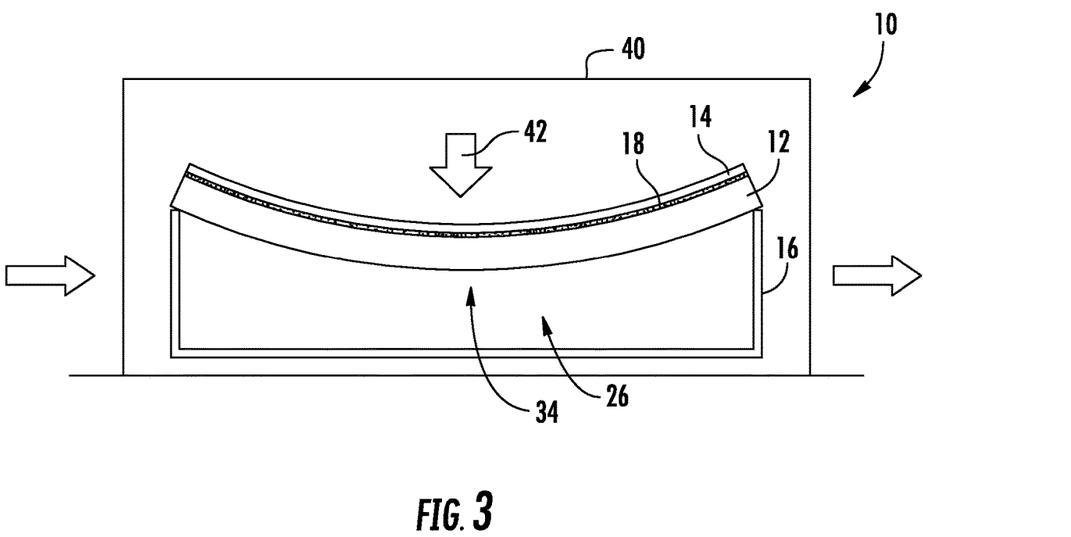
FIG. 3 is a cross-sectional view showing the stacked glass sheets of FIG. 2 supported by a bending ring within a heating station, according to an exemplary embodiment.

Next, referring to FIG. 3, bending ring 16, supported glass sheets 12 and 14 and separation material 18 are moved into a heating station 40, such as an oven or serial indexing lehr. Within heating station 40, glass sheets 12 and 14, separation material 18 and bending ring 16 are heated (e.g., to near or at the softening temperature of the glass material of glass sheets 12 and 14) while glass sheets 12 and 14 are supported on bending ring 16. As glass sheets 12 and 14 are heated, a shaping force, such as the downward force 42, causes central region 34 of glass sheets 12 and 14 to deform or sag downward into central cavity 26 of bending ring 16.

In specific embodiments, the downward force is provided by gravity. In some embodiments, the downward force 42 may be provided via air pressure (e.g., creating a vacuum on the convex side of glass sheets 12 and 14, blowing air on the concave side of glass sheets 14) or through a contact-based molding machine (e.g., co-pressing equipment). It should be understood that in some embodiments, cavity 26 is a mold cavity, and in such embodiments, inward facing surface 24 of sidewall 20 and the upward facing surface of bottom wall 22 defines a shape against which glass sheets 12 and 14 pressed to form a desired curved shape. Regardless of the source of the deforming force, this procedure results in glass sheets 12 and 14 having a generally curved shape, as represented in FIG. 3.

After a period of time determined to allow glass sheets 12 and 14 to develop the desired curved shape, bending ring 16 along with the supported glass sheets 12 and/or 14 are then cooled to room temperature. Thus, the shaped, deformed or curved glass sheets 12 and 14 are allowed to cool, fixing glass sheets 12 and 14 into the curved shape created within heating station 40. Once cooled, curved glass sheets 12 and 14 are removed from bending ring 16 and another set of flat glass sheets are placed onto bending ring 16, and the shaping process is repeated. Following shaping, the now curved glass sheets 12 and 14 are bonded together (e.g., typically via a polymer interlayer) into the final curved glass, laminate article.

Figure 4:
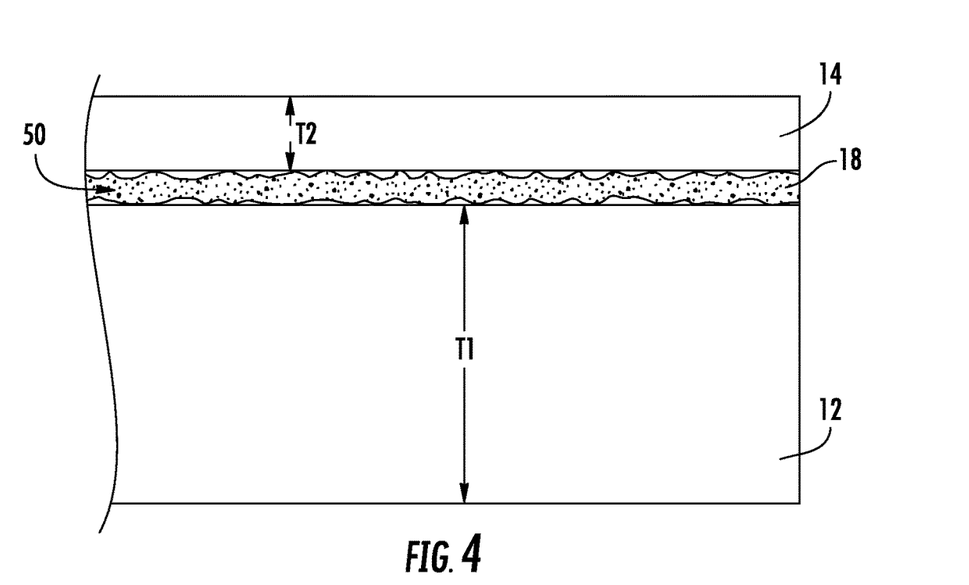
FIG. 4 is a detailed view of the stacked glass sheets of FIG. 2, according to an exemplary embodiment

In particular embodiments, glass sheets 12 and 14 may be particularly susceptible to bending dot formation, at least if a conventional separation material were used, due to large thickness differences and/or material differences between glass sheets 12 and 14. Referring to FIG. 4, in specific embodiments, separation material 18 enables co-sagging of glass sheets 12 and 14 even with large thickness differentials. As shown in FIG. 4, glass sheet 12 has a thickness, shown as T1, and glass sheet 14 has a thickness, shown as T2. In general, T1 is different from T2, and specifically T1 is greater than T2. In various embodiments, T1 is at least 2.5 times greater than T2, and in other embodiments, T2 is at least 2.5 times greater than T1. In specific embodiments, T1 is between 1.5 mm and 4 mm, and T2 is between 0.3 mm and 1 mm, and in even more specific embodiments, T2 is less than 0.6 mm. In specific embodiments: T1 is 1.6 mm and T2 is 0.55 mm; T1 is 2.1 mm and T2 is 0.55 mm; T1 is 2.1 mm and T2 is 0.7 mm; T1 is 2.1 mm and T2 is 0.5 mm; T1 is 2.5 mm and T2 is 0.7 mm.

In the embodiment shown in FIG. 4, the thicker glass sheet 12 is located below the thinner glass sheet 14 when stacked on bending ring 16. To decrease bending dot formation when co-sagging glass sheets of different thicknesses, some sources have indicated that placing the thicker sheet above the thinner sheet on the bending ring will decrease bending dot formation. However, as shown in the experimental examples below, Applicant has determined that this prior approach is not particularly effective at reducing bending dot formation, particularly when large sheet thickness differentials and/or large viscosity differences are present, and the separation materials discussed herein have been determined to be effective at reducing or eliminating bending dot formation in these cases. However, it should be understood that in other embodiments, the separation material innovations discussed herein may be utilized in co-sagging arrangements where the thinner glass sheet 14 is located below thicker glass sheet 12 in the stack supported by bending ring 16.

In addition to addressing bending dot formation believed to result from thickness differentials, the separation materials discussed herein have been determined to be particularly suitable for co-sagging glass sheets 12 and 14 formed from different glass materials. As noted above, it is believed that when glass sheets of different materials are co-sagged together, viscosity differences between the two materials at the co-sagging temperature results in increased contact pressures in the regions where sagging shape is different (e.g., see FIGS. 6 and 7). Applicant has determined that the separation material innovations discussed herein decrease or eliminate bending dot formation even when co-sagging glass sheets of different materials.

Thus, in various embodiments, glass sheet 12 is formed from a first glass material/composition, and glass sheet 14 is formed from a second glass material/composition different from the first material. In some such embodiments, the first glass material has a viscosity that is different from the viscosity of the second glass material during heating within heating station 40. While a wide variety of glass materials may be used to form glass sheets 12 and/or 14, in specific embodiments, the first glass material of sheet 12 is a soda lime glass, and the second glass material of sheet 14 is an alkali aluminosilicate glass composition or an alkali aluminoborosilicate glass composition. Additional exemplary materials for glass sheets 12 and 14 are identified in detail below.

Applicant has determined that various separation materials and/or application techniques allow for co-sagging glass sheets having different thicknesses and/or different material properties while reducing or eliminating bending dot formation. In some exemplary embodiments, separation material 18 is a particulate material that is applied to the upper surface of glass sheet 12 forming a layer of particular material 50 as shown in FIG. 4. In various embodiments, separation material 18 is formed from a solid lubricating material that decreases friction between glass sheet 12 and glass sheet 14. Without wishing to be bound by theory, Applicant's testing has indicated that decreasing friction between glass sheets 12 and 14 during co-sagging decreases bending dot formation. In some such embodiments, the solid lubricating material has a lamellar structure, and specifically is an inorganic lubricating material having a lamellar structure. In even more specific embodiments, the solid lubricating material is a hexagonal boron nitride material and/or a graphite material. In such embodiments, these lamellar, inorganic solid lubricants are believed to have lubricity that are higher than conventional separation materials. In other embodiments, separation material 18 may be a $CaCO_3$ material, a silica-based material, a hydrated magnesium silicate material, and/or a molybdenum disulfide material.

In particular embodiments, Applicant believes that hexagonal boron nitride (HBN) has a number of properties making it particularly suitable for use as separation material 18. For example, the layered structure of HBN allows sliding movement of the parallel planes. Weak bonding between the planes provides low shear strength in the direction of the sliding movement but high compression strength in the direction perpendicular to the sliding movement. HBN forms a lubrication film strongly adhered to the substrate surface. The lubrication film provides good wear resistance and seizure resistance (compatibility). Boron nitride is a chemically inert substance. It is non-reactive to most acids, alkalis, solvents and non-wetted by molten aluminum, magnesium, molten salts and glass. Hexagonal boron nitride retains its lubrication properties up to 5000° F. (2760° C.) in inert or reducing environment and up to 1600° F. (870° C.) in oxidizing atmosphere. In addition, boron nitride has high thermal conductivity.

In other embodiments, graphite and/or molybdenum disulfide ($MoS_2$) may be used as solid lubricants for separation material 18. In the form of dry powder, these materials are effective lubricant additives due to their lamellar structure. The lamellas orient parallel to the surface in the direction of motion. Even between highly loaded stationary surfaces, the lamellar structure of these materials is able to prevent contact between glass sheets 12 and 14. In the direction of motion, the lamellas easily shear over each other resulting in a low friction. In other embodiments, separation material 18 may be other solid lubricating materials including polytetrafluoroethylene (PTFE), talc, calcium fluoride, cerium fluoride and tungsten disulfide.

In yet other embodiments, separation material 18 may be a friction or contact pressure reducing sheet of material such as a cloth sheet. In other embodiments, separation material 18 may be a thick layer of $CaCO_3$ material. In contrast to conventional understanding, Applicant has found that increasing thickness of a $CaCO_3$ separation material layer 50 actually reduces bending dot formation.

In specific embodiments, separation material 18 may be applied to the upper surface of glass sheet 12 via a spraying process. Applicant believes that utilizing a spraying process (as opposed to roll-based powder applicators typically used in conventional processes) results in a thin, yet highly uniform layer of separation material 18 that decreases bending dot formation. In one embodiment, separation material 18 is a solid lubricating material suspended in a carrier fluid (e.g., water, alcohol, gas, etc.), and separation material 18 is applied to the upper surface of glass sheet 12 by spraying the carrier fluid supporting the solid lubricating material onto glass sheet 12. In embodiments where the carrier fluid is a liquid, when the carrier fluid evaporates, a thin and uniform layer of the solid lubricating particles remain on glass sheet 12 forming separation layer 50 shown in FIG. 4. In embodiments where the carrier fluid is a gas, the gas stream delivers lubricating particles to the glass surface, forming a thin and uniform layer of the solid lubricating particles on glass sheet 12 to create separation layer 50 shown in FIG. 4. In various embodiments, a boron nitride material or a silica-based lubricating material is applied via a spraying process utilizing a carrier fluid. In a specific embodiment, a silica-based lubricating material comprises a Lo-Vel HSF material available from PPG Industries, Inc. dispersed in a water solution and sprayed onto glass sheet 12 forming separation layer 50.

In other embodiments, separation material 18 may be sprayed onto glass sheet via other spraying processes. In one specific embodiment, the separation material 18 is a solid lubricating material, such as graphite, which is sprayed on to glass sheet 12 via a flame pyrolysis process.

Figure 5:
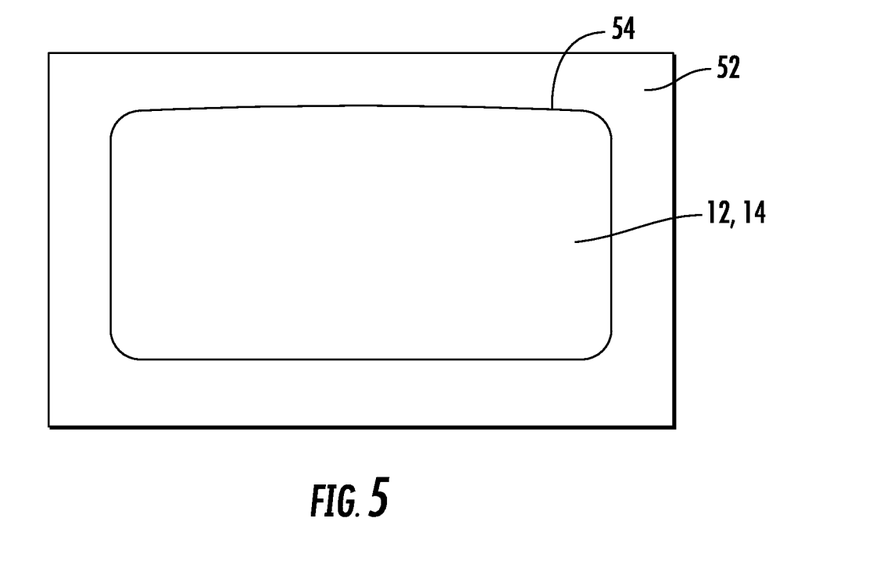
FIG. 5 is a plan view of a glass preform cut from a glass sheet used to form the stacked glass sheets of FIG. 2, according to an exemplary embodiment.

For completeness, additional steps for forming a glass laminate article before and after the co-sagging process are provided. Referring to FIG. 5, by way of example, glass sheet 12 or 14 (also referred to as a preform) are cut from their individual stock glass sheets 52. The shape of the perimeter 54 is defined by a flat pattern as needed to produce the desired shape following co-sagging. After glass sheets 12 and 14 are cut from the stock glass sheet, the edges may be ground to break the sharp corners. Following this process, glass sheets 12 and 14 are stacked and co-sagged as explained above regarding FIGS. 1-4.

In various embodiments, a curved glass laminate article formed from the process and/or system discussed herein is provided. In specific embodiments, the curved glass laminate article includes sheets 12 and 14 bound together by an interlayer (e.g., a polymer interlayer such as a polyvinyl butyral layer). In such embodiments, the glass laminate article formed from glass sheets 12 and 14 is highly asymmetrical (e.g., has the large thickness differences and/or material property differences discussed above) while at the same time having low levels of bending dot defects and low levels of shape difference between the layers.

In various embodiments, glass sheets 12 and/or 14 following curve formation may be utilized in a variety of applications. In specific embodiments, the glass laminate article produced via the systems and processes discussed herein are used to form vehicle (e.g., automotive) windows. In specific embodiments, the laminate article formed from glass sheets 12 and/or 14 may form the sidelights, windshields, rear windows, windows, rearview mirrors, and sunroofs of a vehicle. As used herein, vehicle includes automobiles, rolling stock, locomotive, boats, ships, and airplanes, helicopters, drones, space craft and the like. In other embodiments, the laminate article formed from glass sheets 12 and/or 14 may be used in a variety of other applications where thin, curved glass laminate articles may be advantageous, such as for architectural glass, building glass, etc.

Glass sheets 12 and/or 14 can be formed from a variety of materials. In specific embodiments, glass sheet 14 is formed from a chemically strengthened alkali aluminosilicate glass composition or an alkali aluminoborosilicate glass composition, and glass sheet 12 is formed from a soda lime glass (SLG) composition. In specific embodiments, glass sheets 12 and/or 14 are formed from a chemically strengthened material, such as an alkali aluminosilicate glass material or an alkali aluminoborosilicate glass composition, having a chemically strengthened compression layer having a depth of compression (DOC) in a range from about 30 μm to about 90 μm, and a compressive stress on at least one of the sheet's major surfaces of between 300 MPa to 1000 MPa. In some embodiments, the chemically strengthened glass is strengthened through ion exchange Examples of Glass Materials and Properties In various embodiments, glass sheets 12 and/or 14 may be formed from any of a variety of strengthened glass compositions. Examples of glasses that may be used for glass sheets 12 and/or 14 described herein may include alkali aluminosilicate glass compositions or alkali aluminoborosilicate glass compositions, though other glass compositions are contemplated. Such glass compositions may be characterized as ion exchangeable. As used herein, "ion exchangeable" means that the layer comprising the composition is capable of exchanging cations located at or near the surface of the glass layer with cations of the same valence that are either larger or smaller in size. In one exemplary embodiment, the glass composition of glass sheets 12 and/or 14 comprises $SiO_2$, $B_2O_3$ and $Na_2O$, where $(SiO_2+B_2O_3) \geq 66$ mol. %, and $Na_2O \geq 9$ mol. %. Suitable glass compositions for glass sheets 12 and/or 14, in some embodiments, further comprise at least one of $K_2O$, MgO, and CaO. In a particular embodiment, the glass composition used in glass sheets 12 and/or 14 can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example of glass composition suitable for glass sheets 12 and/or 14 comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %.

Even further, another example of glass composition suitable for glass sheets 12 and/or 14 comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O) \leq 18$ mol. % and 2 mol. % $\leq (MgO+CaO) \leq 7$ mol. %.

In a particular embodiment, an alkali aluminosilicate glass composition suitable for glass sheets 12 and/or 14 comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $((Al_2O_3+B_2O_3)/\Sigma modifiers) > 1$, where in the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $((Al_2O_3+B_2O_3)/\Sigma modifiers) > 1$.

In still another embodiment, glass sheets 12 and/or 14 may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % $\leq SiO_2+B_2O_3+CaO \leq 69$ mol. %; $Na_2O+K_2O+B_2O_3+MgO+CaO+SrO > 10$ mol. %; 5 mol. % $\leq MgO+CaO+SrO \leq 8$ mol. %; $(Na_2O+B_2O_3)-Al_2O_3 \leq 2$ mol. %; 2 mol. % $\leq Na_2O-Al_2O_3 \leq 6$ mol. %; and 4 mol. % $\leq (Na_2O+K_2O)-Al_2O_3 \leq 10$ mol. %.

In an alternative embodiment, glass sheets 12 and/or 14 may comprise an alkali aluminosilicate glass composition comprising: 2 mol % or more of $Al_2O_3$ and/or $ZrO_2$, or 4 mol % or more of $Al_2O_3$ and/or $ZrO_2$. In one or more embodiments, glass sheets 12 and/or 14 comprise a glass composition comprising $SiO_2$ in an amount in the range from about 67 mol % to about 80 mol %, $Al_2O_3$ in an amount in a range from about 5 mol % to about 11 mol %, an amount of alkali metal oxides ($R_2O$) in an amount greater than about 5 mol % (e.g., in a range from about 5 mol % to about 27 mol %). In one or more embodiments, the amount of $R_2O$ comprises $Li_2O$ in an amount in a range from about 0.25 mol % to about 4 mol %, and $K_2O$ in an amount equal to or less than 3 mol %. In one or more embodiments, the glass composition includes a non-zero amount of MgO, and a non-zero amount of ZnO.

In other embodiments, glass sheets 12 and/or 14 are formed from a composition that exhibits $SiO_2$ in an amount in the range from about 67 mol % to about 80 mol %, $Al_2O_3$ in an amount in the range from about 5 mol % to about 11 mol %, an amount of alkali metal oxides ($R_2O$) in an amount greater than about 5 mol % (e.g., in a range from about 5 mol % to about 27 mol %), wherein the glass composition is substantially free of $Li_2O$, and a non-zero amount of MgO; and a non-zero amount of ZnO.

In other embodiments, glass sheets 12 and/or 14 are an aluminosilicate glass article comprising: a glass composition comprising $SiO_2$ in an amount of about 67 mol % or greater; and a sag temperature in a range from about 600° C. to about 710° C. In other embodiments, glass sheets 12 and/or 14 are formed from an aluminosilicate glass article comprising: a glass composition comprising $SiO_2$ in an amount of about 68 mol % or greater; and a sag temperature in a range from about 600° C. to about 710° C. (as defined herein).

In some embodiments, glass sheets 12 and/or 14 are formed from different glass materials from each other that differs in any one or more of composition, thickness, strengthening level, and forming method (e.g., float formed as opposed to fusion formed). In one or more embodiments, glass sheets 12 and/or 14 described herein have a sag temperature of about 710° C., or less or about 700° C. or less. In one or more embodiments, one of the glass sheets 12 and 14 is a soda lime glass sheet, and the other of the glass sheets 12 and 14 is any one of the non-soda lime glass materials discussed herein. In one or more embodiments, glass sheets 12 and/or 14 comprises a glass composition comprising $SiO_2$ in an amount in the range from about 68 mol % to about 80 mol %, $Al_2O_3$ in an amount in a range from about 7 mol % to about 15 mol %, $B_2O_3$ in an amount in a range from about 0.9 mol % to about 15 mol %; a non-zero amount of $P_2O_5$ up to and including about 7.5 mol %, $Li_2O$ in an amount in a range from about 0.5 mol % to about 12 mol %, and $Na_2O$ in an amount in a range from about 6 mol % to about 15 mol %.

In some embodiments, the glass composition of glass sheets 12 and/or 14 may include an oxide that imparts a color or tint to the glass articles. In some embodiments, the glass composition of glass sheets 12 and/or 14 includes an oxide that prevents discoloration of the glass article when the glass article is exposed to ultraviolet radiation. Examples of such oxides include, without limitation, oxides of: Ti, V, Cr, Mn, Fe, Co, Ni, Cu, Ce, W, and Mo.

Glass sheets 12 and/or 14 may have a refractive index in the range from about 1.45 to about 1.55. As used herein, the refractive index values are with respect to a wavelength of 550 nm. Glass sheets 12 and/or 14 may be characterized by the manner in which it is formed. For instance, glass sheets 12 and/or 14 may be characterized as float-formable (i.e., formed by a float process), down-drawable and, in particular, fusion-formable or slot-drawable (i.e., formed by a down draw process such as a fusion draw process or a slot draw process). In one or more embodiments, glass sheets 12 and/or 14 described herein may exhibit an amorphous microstructure and may be substantially free of crystals or crystallites. In other words, in such embodiments, the glass articles exclude glass-ceramic materials.

In one or more embodiments, glass sheets 12 and/or 14 exhibits an average total solar transmittance of about 88% or less, over a wavelength range from about 300 nm to about 2500 nm, when glass sheets 12 and/or 14 has a thickness of 0.7 mm. For example, glass sheets 12 and/or 14 exhibits an average total solar transmittance in a range from about 60% to about 88%, from about 62% to about 88%, from about 64% to about 88%, from about 65% to about 88%, from about 66% to about 88%, from about 68% to about 88%, from about 70% to about 88%, from about 72% to about 88%, from about 60% to about 86%, from about 60% to about 85%, from about 60% to about 84%, from about 60% to about 82%, from about 60% to about 80%, from about 60% to about 78%, from about 60% to about 76%, from about 60% to about 75%, from about 60% to about 74%, or from about 60% to about 72%.

In one or more embodiments, glass sheets 12 and/or 14 exhibit an average transmittance in the range from about 75% to about 85%, at a thickness of 0.7 mm or 1 mm, over a wavelength range from about 380 nm to about 780 nm. In some embodiments, the average transmittance at this thickness and over this wavelength range may be in a range from about 75% to about 84%, from about 75% to about 83%, from about 75% to about 82%, from about 75% to about 81%, from about 75% to about 80%, from about 76% to about 85%, from about 77% to about 85%, from about 78% to about 85%, from about 79% to about 85%, or from about 80% to about 85%. In one or more embodiments, glass sheets 12 and/or 14 exhibits $T_{uv-380}$ or $T_{uv-400}$ of 50% or less (e.g., 49% or less, 48% or less, 45% or less, 40% or less, 30% or less, 25% or less, 23% or less, 20% or less, or 15% or less), at a thickness of 0.7 mm or 1 mm, over a wavelength range from about 300 nm to about 400 nm.

In one or more embodiments, glass sheets 12 and/or 14 may be strengthened to include compressive stress that extends from a surface to a depth of compression (DOC). The compressive stress regions are balanced by a central portion exhibiting a tensile stress. At the DOC, the stress crosses from a positive (compressive) stress to a negative (tensile) stress.

In one or more embodiments, glass sheets 12 and/or 14 may be strengthened mechanically by utilizing a mismatch of the coefficient of thermal expansion between portions of the article to create a compressive stress region and a central region exhibiting a tensile stress. In some embodiments, the glass article may be strengthened thermally by heating the glass to a temperature below the glass transition point and then rapidly quenching.

In one or more embodiments, glass sheets 12 and/or 14 may be chemically strengthening by ion exchange. In the ion exchange process, ions at or near the surface of glass sheets 12 and/or 14 are replaced by—or exchanged with—larger ions having the same valence or oxidation state. In those embodiments in which glass sheets 12 and/or 14 comprises an alkali aluminosilicate glass, ions in the surface layer of the article and the larger ions are monovalent alkali metal cations, such as $Li^+$, $Na^+$, $K^+$, $Rb^+$, and $Cs^+$. Alternatively, monovalent cations in the surface layer may be replaced with monovalent cations other than alkali metal cations, such as $Ag^+$ or the like. In such embodiments, the monovalent ions (or cations) exchanged into glass sheets 12 and/or 14 generate a stress.

Experimental Examples

Applicant has conducted a number of experiments to understand and evaluate bending dot formation during co-sagging of high asymmetry glass pairs as discussed herein.

Experimental Example 1

To understand the dependence of glass thickness asymmetry on the formation of bending dot defects, multiple stacks of different combinations of glass sheets having different thicknesses were co-sagged in a lehr furnace (similar to the arrangement shown in FIG. 3) using conventional $CaCO_3$ separation powder, applied in the conventional manner at the low conventional thickness (e.g., at thickness that may be as low as 1-2 particles thick and dispersed), and observations of bending dot defects were made using transmitted light optics techniques. Stacks of glass sheets having the following thicknesses were co-sagged: 2.1 mm/0.55 mm, 1.1 mm/0.7 mm, 2.1 mm/2.1 mm, 0.7 mm/0.7 mm. Bending dot defects were significantly worse in the 2.1 mm/0.55 mm stack than any other. In these tests, the thicker sheet was soda-lime glass and the thinner sheets were alkali boro-aluminosilicate glasses. The 1.1 mm/0.7 mm produced less bending dot defects than 2.1 mm/0.55 mm, but they did still exist. The symmetric stack of 2.1 mm/2.1 mm and 0.7 mm/0.7 mm did not produce any bending dot defects. From this experiment, it was concluded that greater glass thickness asymmetries produce more bending dot defects with all other conditions left constant.

Experimental Example 2

To understand the effect of contact pressure and different glass viscosity, additional experiments were conducted. As background, referring to FIGS. 6 and 7, when formed singly on a bending ring 16, a thicker glass sheet 100 will produce a more parabolic shape, while a thinner sheet 102 will produce a "bath tub" like shape where curvature is greatest near the edges and is reduced near the center. Thus in a pair sagging stack where the thin ply is placed atop of the thick ply, bending dot defects are present around the perimeter of the glass sheets, but not in the center. It was hypothesized that this is due to increased contact pressure around the perimeter due to the tendency of the differing thickness plies to form different shapes. The "bath tub"-like shape that the thin ply has a tendency to form, may be creating a higher contact pressure around the perimeter.

To test this hypothesis, an experiment was run where the glass stack was inverted. i.e., the thick glass sheet was placed on top of the thin glass sheet during co-sagging. In this experiment, the thick glass sheet was separated from the thin glass sheet by a thin $CaCO_3$ separation powder, applied in the conventional manner. In this arrangement, the contact pressure should be reduced around the perimeter of the part and increased in the center. The result of this experiment showed a shift in the bending dot location from the perimeter to the center of the part. This confirmed the hypothesis that bending dot defects are dependent on contact pressure between the glass sheets.

Experimental Example 3

To understand the effect of the separation material, additional experiments were conducted. Applicant understands that those in the field typically believe that bending dot defects are the result of separation powder imprintation into the glass. Experiments were performed on asymmetric glass sheets by reducing the amount of separation powder between the plies in an attempt to support this hypothesis. The reduction of separation powder, including $CaCO_3$, talc and PPG Lo-Vel HSF did not reduce the formation of bending dots for largely asymmetric glass pairs. In addition to reducing the quantity of separation powder, efforts were also made to eliminate large particles/contaminates in the separation powder by drying and sieving the powders to control the final particle size of the separation media. These efforts also did not reduce the formation of bending dots for largely asymmetric glass pairs.

Experimental Example 4

Gravity co-sagging of asymmetric glass sheets without the use of separation powder was evaluated. When glass sheets of the same composition and thickness were evaluated, the glass sheets fused to each other during co-sagging, demonstrating the key role of separation powder. When asymmetric glass sheets of different composition were gravity co-sagged without the use of separation powder, the glass plies did not fuse to each other. However, bending dots distortions were visible on the thinner of the two glass sheets. This indicates bending dots are not solely caused by the presence of separation media or large particle contamination, but is also the result of glass to glass contact.

Experimental Example 5

Since no significant reduction in bending dot formation was seen by reducing the amount of separation powder used, an experiment was performed in the opposite direction. $CaCO_3$ separation powder thickness was significantly increased, and based on conventional understanding, an increase in the formation of bending dots was expected with the use of the additional separation powder. However, surprisingly the result of this experiment showed the opposite of what was expected. Bending dot defect formation was in fact significantly reduced using the thicker layer of separation powder. From this Applicant has concluded that a uniform application of the separation powder is an important factor in bending dot reduction.

Experimental Example 6

PPG Lo-Vel HSF (a commercially available, silica based, powder) was used as a separation powder. When applied using standard powder application techniques (e.g., lightly brushed onto the surface, roll application (i.e. like a paint roller) or gravity (a roller is rolled over a screen which causes the powder to fall onto the surface below resulting in a light dusting), Lo-Vel HSF was not effective at eliminating bending dots for gravity co-sagging of asymmetric glass sheets. However, when Lo-Vel HSF was dispersed in a water solution and applied via spray application, significant improvement in the reduction of bending dots for asymmetric glass plies was demonstrated. This indicates utilizing of spray application of the separation material can reduce bending dot formation. In this test, the following method was used to make and apply the PPG Lo-Vel HSF solution: 1) add 12.5 g of Lo-Vel powder, 2) add 200 g of distilled water; 3) add 25 g of 5% solsperse 27000 solution available from Lubrizol Corporation; 4) mix the solution with Silveron L5M-A mixer at 6000 rpm for 20 minutes; 5) apply to glass using hand operated spray bottle Experimental Example 7

Applicant conducted tests utilizing flame deposited carbon and spray application of hexagonal boron nitride as the separation material, and these tests demonstrated that both were highly effective at minimizing and eliminating bending dot formation. Based on these tests, Applicant believes that the uniform application of these inorganic lubricants via the spray application process combined with their highly lubricous, lamellar structure reduces the contact pressure between the asymmetric glass plies during co-sagging and minimizes or eliminates the formation of bending dots.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

Aspect (1) of the present disclosure pertains to a process for forming a curved glass laminate article comprising: applying a separation material onto at least one of a surface of a first sheet of glass material and a surface of a second sheet of glass material; placing an outer region of the first sheet of glass material into contact with a support surface of a shaping frame, the shaping frame defining an open central cavity surrounded at least in part by the support surface; placing the second sheet of glass material onto the first sheet of glass material such that the separation material is located between an upper surface of the first sheet of glass material and a lower surface of the second sheet of glass material, wherein the first sheet of glass material and the second sheet of glass material are both supported by the shaping frame; and heating the first sheet of glass material, the separation material and the second sheet of glass material together while supported by the shaping frame such that central regions of the first and second sheets of glass material deform downward into the open central cavity of the shaping frame; wherein the first sheet of glass material has an average thickness, T1, and the second sheet of glass material has an average thickness, T2, wherein T1 is at least 2.5 times T2.

Aspect (2) of the present disclosure pertains to the process of Aspect (1), wherein T1 is between 1.5 mm and 4 mm, and T2 is between 0.3 mm and 1 mm.

Aspect (3) of the present disclosure pertains to the process of Aspect (1), wherein T2 is less than 0.6 mm.

Aspect (4) of the present disclosure pertains to the process of any one of Aspects (1)-(3), wherein the first sheet of glass material is formed from a first glass composition and the second sheet of glass material is formed from a second glass composition different from the first glass composition, and the first glass composition has a viscosity during heating that is different from a viscosity of the second glass composition during heating.

Aspect (5) of the present disclosure pertains to the process of any one of Aspects (1)-(4), wherein the separation material comprises a solid lubricating material that decreases friction between the first and second sheets of glass material.

Aspect (6) of the present disclosure pertains to the process of any one of Aspects (1)-(5), wherein the separation material is applied via a spraying process.

Aspect (7) of the present disclosure pertains to the process of Aspect (6), wherein the spaying process comprises at least one of spraying a particulate material supported by a carrier fluid onto the first sheet of glass material and a flame pyrolysis process.

Aspect (8) of the present disclosure pertains to a process for forming a curved glass laminate article comprising: spraying a separation material onto at least one of a surface of a first sheet of glass material and a surface of a second sheet of glass material; placing an outer region of the first sheet of glass material into contact with a support surface of a shaping frame, the shaping frame defining an open central cavity surrounded at least in part by the support surface; placing the second sheet of glass material onto the first sheet of glass material such that the separation material is located between an upper surface of the first sheet of glass material and a lower surface of the second sheet of glass material, wherein the first sheet of glass material and the second sheet of glass material are both supported by the shaping frame; and heating the first sheet of glass material, the separation material and the second sheet of glass material together while supported by the shaping frame such that central regions of the first and second sheets of glass material deform downward into the open central cavity of the shaping frame; wherein the first sheet of glass material is formed from a first glass composition and the second sheet of glass material is formed from a second glass composition different from the first glass composition.

Aspect (9) of the present disclosure pertains to the process of Aspect (8), wherein the first sheet of glass material has an average thickness, T1, and the second sheet of glass material has an average thickness, T2, wherein T1 is at least 2.5 times greater than T2 or T2 is at least 2.5 times greater than T1.

Aspect (10) of the present disclosure pertains to the process of Aspect (9), wherein T1 is between 1.5 mm and 4 mm, and T2 is between 0.3 mm and 1 mm.

Aspect (11) of the present disclosure pertains to the process of Aspect (10), wherein T2 is less than 0.6 mm.

Aspect (12) of the present disclosure pertains to the process of any one of Aspects (8)-(11), wherein the separation material is a solid lubricating material suspended in a carrier fluid, and the spraying comprises spraying the carrier fluid supporting the solid lubricating material onto the upper surface of the first sheet of glass material.

Aspect (13) of the present disclosure pertains to the process of any one of Aspects (8)-(11), wherein the separation material comprises a solid lubricating material and the spraying comprises flame pyrolysis of the solid lubricating material onto the upper surface of the first sheet of glass material.

Aspect (14) of the present disclosure pertains to the process of any one of Aspects (8)-(11), wherein the separation material comprises at least one of a boron nitride material, a graphite material, $CaCO_3$ material, silica-based material, a hydrated magnesium silicate material, and a molybdenum disulfide material.

Aspect (15) of the present disclosure pertains to the process of any one of Aspects (8)-(14), wherein the first glass composition has a viscosity during heating that is different than a viscosity of the second glass composition during heating.

Aspect (16) of the present disclosure pertains to the process of Aspect (8), wherein the first glass composition is soda lime glass and the second glass composition is an alkali aluminosilicate glass composition or an alkali aluminoborosilicate glass composition.

Aspect (17) of the present disclosure pertains to the process of any one of Aspects (8)-(16), wherein the separation material is a layer of particles deposited via spraying onto the upper surface of the first sheet of glass material.

Aspect (18) of the present disclosure pertains to a process for forming a curved glass laminate article comprising: depositing a separation material onto at least one of a surface of a first sheet of glass material and a surface of a second sheet of glass material; placing an outer region of the first sheet of glass material into contact with a support surface of a shaping frame, the shaping frame defining an open central cavity surrounded at least in part by the support surface; placing the second sheet of glass material onto the first sheet of glass material such that the separation material is located between an upper surface of the first sheet of glass material and a lower surface of the second sheet of glass material, wherein the first sheet of glass material and the second sheet of glass material are both supported by the shaping frame; and heating the first sheet of glass material, the separation material and the second sheet of glass material together while supported by the shaping frame such that central regions of the first and second sheets of glass material deform downward into the open central cavity of the shaping frame; wherein the separation material comprises a solid lubricating material that decreases friction between the first and second sheets of glass material; wherein the first sheet of glass material has an average thickness, T1, and the second sheet of glass material has an average thickness, T2, wherein T1 is different from T2; wherein the first sheet of glass material is formed from a first glass composition and the second sheet of glass material is formed from a second glass composition different from the first glass composition, and the first glass composition has a viscosity during heating that is different from a viscosity of the second glass composition during heating.

Aspect (19) of the present disclosure pertains to the process of Aspect (18), wherein the solid lubricating material comprises a lamellar structure.

Aspect (20) of the present disclosure pertains to the process of Aspect (18) or Aspect (19), wherein the solid lubricating material is at least one of hexagonal boron nitride and graphite.

Aspect (21) of the present disclosure pertains to the process of any one of Aspects (18)-(20), wherein T1 is at least 2.5 times greater than T2 or T2 is at least 2.5 times greater than T1.

Aspect (22) of the present disclosure pertains to the process of any one of Aspects (18)-(21), wherein T1 is between 1.5 mm and 4 mm, and T2 is between 0.3 mm and 1 mm.

Aspect (23) of the present disclosure pertains to the process of Aspect (22), wherein T2 is less than 0.6 mm.

Aspect (24) of the present disclosure pertains to the process of any one of Aspects (18)-(23), wherein the separation material is a layer of particles deposited onto the upper surface of the first sheet of glass material via a spraying process.

Aspect (24) of the present disclosure pertains to a curved glass laminate article made by the method(s) and/or system(s) disclosed herein, or made by the method(s) of any one of Aspects (1)-(24).

What is claimed is:

1. A process for forming a curved glass laminate article comprising:
    depositing a separation material onto at least one of a surface of a first sheet of glass material and a surface of a second sheet of glass material;
    placing an outer region of the first sheet of glass material into contact with a support surface of a shaping frame, the shaping frame defining an open central cavity surrounded at least in part by the support surface;
    placing the second sheet of glass material onto the first sheet of glass material such that the separation material is located between an upper surface of the first sheet of glass material and a lower surface of the second sheet of glass material, wherein the first sheet of glass material and the second sheet of glass material are both supported by the shaping frame; and
    heating the first sheet of glass material, the separation material and the second sheet of glass material together while supported by the shaping frame such that central regions of the first and second sheets of glass material deform downward into the open central cavity of the shaping frame;
    wherein the separation material comprises a solid lubricating material that decreases friction between the first and second sheets of glass material;
    wherein the first sheet of glass material has an average thickness, T1, and the second sheet of glass material has an average thickness, T2, wherein T1 is different from T2;
    wherein the first sheet of glass material is formed from a first glass composition and the second sheet of glass material is formed from a second glass composition different from the first glass composition, and the first glass composition has a viscosity during heating that is different from a viscosity of the second glass composition during heating;
    wherein the solid lubricating material is at least one of hexagonal boron nitride and graphite, and
    wherein the solid lubricating material comprises a lamellar structure.

2. The process of claim 1, wherein T1 is at least 2.5 times greater than T2 or T2 is at least 2.5 times greater than T1.

3. The process of claim 1, wherein T1 is between 1.5 mm and 4 mm, and T2 is between 0.3 mm and 1 mm.

4. The process of claim 3, wherein T2 is less than 0.6 mm.

* * * * *